3,133,922
9-CYANO-(IH)-INDENO[2,1-d]-PYRIMIDINES AND METHOD OF PREPARATION

Pierre Marie Vanhoof, Brussels, Belgium, assignor to Manufacture de Produits Pharmaceutiques A. Christiaens Societe Anonyme, Brussels, Belgium
No Drawing. Filed Mar. 27, 1961, Ser. No. 98,320
Claims priority, application Great Britain Apr. 1, 1960
18 Claims. (Cl. 260—251)

The present invention relates to new nitrogenous heterocyclic compounds and to their preparation.

The invention provides new 1-H-9-cyano-2-$R_1$-indeno-[2,1-d]pyrimidines corresponding to the following general formula:

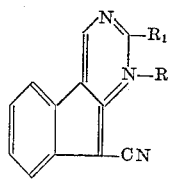

I in which R is selected from the class consisting of hydrogen and an alkaline metal such as sodium and potassium, $R_1$ is selected from the class consisting of hydrogen, a nitro group, an halogen atom, an alkyl radical, an aryl radical, a substituted aryl radical, an alkylaryl radical, a substituted alkylaryl radical.

The substituents of the substituted aryl and alkylaryl radicals are preferably lower alkyl, alkoxy, nitro radicals or an atom of a halogen.

Among the new nitrogenous heterocyclic compounds according to the invention, there may be cited as illustrative and non-restrictive examples the following compounds, as well as their sodium and potassium salts:

1-H-9-cyano-indeno-[2,1-d]-pyrimidine (Formula I: R=H; $R_1$=H);
1-H-9-cyano-2-methyl-indeno-[2,1-d]-pyrimidine (Formula I: R=H; $R_1$=$CH_3$);
1-H-9-cyano-2-ethyl-indeno[2,1-d]-pyrimidine (Formula I: R=H; $R_1$=$C_2H_5$);
1-H-9-cyano-2-butyl-indeno[2,1-d]-pyrimidine (Formula I: R=H; $R_1$=$C_4H_9$);
1-H-9-cyano-2-isopropyl-indeno[2,1-d]pyrimidine (Formula I:

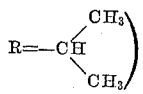

1-H-9-cyano-2-phenyl-indeno[2,1-d]-pyrimidine (Formula I: R=H; $R_1$=$C_6H_5$);
1-H-9-cyano-2(p-methylphenyl)indeno[2,1-d]-pyrimidine (Formula I: R=H; $R_1$=—$C_6H_4.CH_3$);
1-H-9-cyano-2(m-methylphenyl)-indeno[2,1-d]-pyrimidine (Formula I: $R_1$=—$C_6H_4CH_3$);
1-H-9-cyano-2(m-ethylphenyl)-indeno[2,1-d]-pyrimidine Formula I: $R_1$=—$C_6H_4C_2H_5$);
1-H-9-cyano-2(m-methoxyphenyl)-indeno[2,1-d]-pyrimidine (Formula I: $R_1$=—$C_6H_4OCH_3$);
1-H-9-cyano-2(m-chloro)-indeno[2,1-d]-pyrimidine (Formula I: $R_1$=$C_6H_4Cl$);
1-H-9-cyano-2-(p-methoxyphenyl)-indeno[2,1-d]-pyrimidine (Formula I: R=H; $R_1$=—$C_6H_4.OCH_3$);
1-H-9-cyano-2(p-chlorophenyl)-indeno[2,1-d]-pyrimidine (Formula I: R=H; $R_1$=—$C_6H_4.Cl$);
1-H-9-cyano-2-($\alpha$-naphthyl)indeno[2,1-d]-pyrimidine (Formula I: R=H; $R_1$=—$C_7H_{10}$);
1-H-9-cyano-2-($\beta$-naphthyl)indeno[2,1-d]-pyrimidine (Formula I: $R_1$=H—$C_7H_{10}$);
1-H-9-cyano-2-benzyl-indeno[2,1-d]-pyrimidine (Formula I: R=H; $R_1$=—$CH_2C_6H_5$);
1-H-9-cyano-2-(p-methoxybenzyl)indeno[2,1-d]pyrimidine (Formula I: R=H; $R_1$=—$CH_2.C_6H_4.OCH_3$);
1-H-9-cyano-2(p-chlorobenzyl)-indeno[2,1-d]pyrimidine (Formula I: $R_1$=—$CH_2C_6H_4.Cl$);
1-H-9-cyano-2-(p-methylbenzyl)-indeno[2,1-d]pyrimidine (Formula I: $R_1$=—$CH_2.C_6H_4CH_3$);
1-H-9-cyano-2-(p-ethylbenzyl)-indeno[2,1-d]pyrimidine (Formula I: $R_1$=—$CH_2.C_6H_4C_2H_5$);
1-H-9-cyano-2-cyclohexyl-indeno[2,1-d]pyrimidine (Formula I: $R_1$=—$C_6H_{11}$);
1-H-9-cyano-cyclopentyl-indeno[2,1-d]pyrimidine (Formula: $R_1$=—$C_5H_9$);
1-H-9-cyano-2-nitro-indeno[2,1-d]pyrimidine (Formula I: $R_1$=—$NO_2$);
1-H-9-cyano-2-bromo-indeno[2,1-d]pyrimidine (Formula I: $R_1$=—Br);
1-H-9-cyano-2-($\beta$-phenyl-ethylene)-indeno[2,1-d]-pyrimidine (Formula I: R=H; $R_1$=$CH_2.CH_2.C_6H_5$).

According to a feature of the invention, the compounds of Formula I are prepared by heating in formamide under reflux a derivative of 1-cyano-2-amino-indene of the formula:

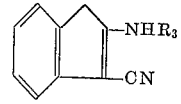

II in which $R_3$ is selected from the class consisting of hydrogen and radicals of the formula —$CO.R_1$, such as the radicals —CO.H, —CO-alkyl, —CO-aryl, —CO-substituted aryl, —CO-alkylaryl, —CO-substituted alkylaryl.

The process of preparation of the new nitrogenous heterocyclic compounds of Formula I can be diagrammatically represented as follows:

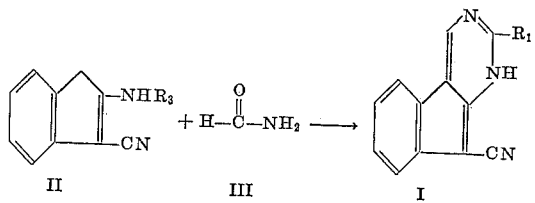

In these formulae:
When $R_3$ indicates hydrogen, $R_1$ indicates hydrogen, or
When $R_3$ indicates a —CO-alkyl, —CO-aryl, —CO-substituted aryl, —CO-alkylaryl or —CO-substituted alkylaryl radical, $R_1$ indicates respectively an alkyl, aryl, substituted aryl, alkylaryl or substituted alkylaryl radical.

If desired, the compounds of Formula I may be converted into an alkali metal salt by reaction with a hydroxide of the formula MeOH, in which Me indicate an alkali metal, such as sodium or potassium. This reaction can be represented as follows:

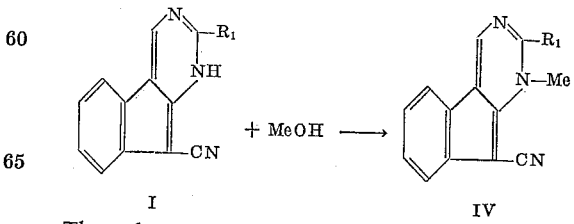

The salts of Formula IV are obtained in soda, or potash, the concentration of which is adapted to the particular solubility of the salts desired. After crystalisation in an aqueous alkaline medium, the salts are dried and recrystallised in an anhydrous mixture of acetone and ether. After two recrystallisations, the salts are obtained in the form of yellow crystals.

The new heterocyclic compounds of Formulae I and IV according to the invention possess interesting specific pharmacodynamic properties. Pharmacological tests have shown that these compounds exert a therapeutic action on the physiological function of the central and peripheral nervous systems, and also exert an action on the musculature.

Specific tests have been made in vivo and have shown that the 1-H-9-cyano-indeno-[2,1-d]-pyrimidine and the 1-H-9-cyano-2-methyl-indeno-[2,1-d]-pyrimidine have a potentializing action on the sleep indicated with phenobarbital, as well as an inhibiting action on the spontaneous motility of mice. Moreover, a clear antispasmodic effect has been observed towards the spasm induced by barium chloride and serotonin. Furthermore, these new heterocyclic compounds have an antipyretic action, whereas they also act as a vasodilator and as compounds lowering the blood pressure.

The new compounds according to this invention are in general intended for internal administration and may be given perorally or parenterally. Tablets are particularly useful for peroral administration, the active compound being mixed with a solid pharmaceutical carrier. Other possible peroral preparating include capsules and also liquid preparations formulated in a suitable liquid base. Solutions for injection may be made up in sterile pyrogen-free water and the less soluble compounds may be accompanied by dissolving or suspending agents, such as Tween or propylene glycol. It is also possible to administer the compounds per rectum, incorporated into a suppository base such as coco butter.

The derivatives of 1-cyano-2-amino-indene of Formula II are also new and are prepared from the 1-cyano-2-amino-indene. This known compound may be prepared by the process of Ch. W. Moore and J. C. Thorpe in J.C.S., 165, 1908.

For preparing the substituted 1-cyano-2-amino-indenes of Formula II, the unsubstituted 1-cyano-2-amino-indene is reacted with an acid chloride, anhydride or a mixed anhydride. The reaction can be represented as follows:

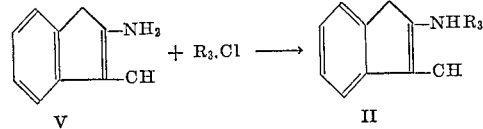

If $R_3$ indicates a —CO—H radical in Formula II, a substituted 1-cyano-2-amino-indene of Formula VII is obtained by reacting mixed anhydride (VI) with 1-cyano-2-amino-indene (V) according to the following schema:

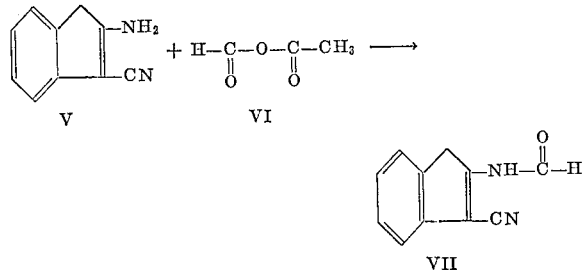

If $R_3$ indicates a —CO—CH$_3$ radical in Formula II, one contains a substituted 1-cyano-2-amino-indene of Formula VIII by reacting acetic anhydride with 1-cyano-2-amino-indene according to the following schema:

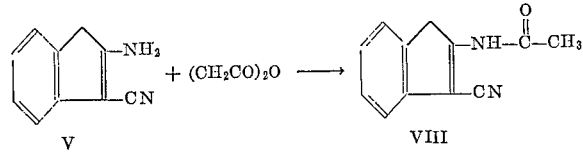

In order that the invention may be well understood, the following examples are given by way of illustration only:

EXAMPLE 1

1. *Preparation of 1-H-9-Cyano-Indeno[2,1-d]Pyrimidine*

(Formula I: R=H; $R_1$=H)

340 g. of 1-cyano-2-amino-indene are suspended in 6 l. of formamide. The reaction mixture is heated under reflux for one hour, with agitation the whole time. The reaction mixture is then allowed to cool and the crystals obtained recovered by filtration. One thus obtains 250 g. of crude product (yield 75%). By dilution of the filtered solution, an additional 20 g. of crude filtration product can be recovered. The crude product is purified by crystallisation in acetone. The product obtained melts at 282–285° C.

*Analysis.*—Found: C=74.64%; H=3.32%; N=21.68%. For $C_{12}H_7N_3$, the calculation shows: C=74.6%; H=3.62%; N=21.8%.

2. *Preparation of the Sodium Salt 1-H-9-Cyano-Indeno[2,1-d]Pyrimidine*

To obtain the sodium salt of the above compound, 10 g. of this compound are dissolved in 65 cc. of 2 N caustic soda. After heating to substantially complete dissolution, the insoluble material which may be present is filtered, the filtrate is then treated with wood charcoal, and thereafter the temperature is lowered in order to cause the crystallisation of the sodium salt. The crystals obtained are filtered and dried. The yield obtained attains 100%.

The product is then recrystallised in an acetone-ether mixture.

EXAMPLE 2

1. *Preparation of 1-Cyano-2-Acetylamino-Indene*

10 g. of 1-cyano-2-amino-indene are heated to boiling during 2 hours in 300 cc. of acetic anhydride. After cooling one obtains 12.7 g. of crystals (yield 83%). After recrystallisation in ethyl alcohol, crystals, melting at 248–250° C. are obtained.

*Analysis.*—Found: C=72.23%; H=5.42%; O=8.39%; N=13.96%. For $C_{12}H_{11}N_2O$ the calculation shows C=72.5%; H=5.53%; O=8.04%; N=14.1%.

2. *Preparation of 1-H-9-Cyano-2-Methyl-Indeno[2,1-d]-Pyrimidine*

(Formula I. R=4; $R_1$=—CH$_3$)

5 g. of 1-cyano-2-acetylamino-indene are suspended in 30 cc. of formamide. After heating under reflux for one hour, one allows to cool in the ice chest overnight. One obtains 4 g. of product. By dilution of the mother liquors, a further quantity of 0.7 g. of the crude product is recovered. (Total yield: 92%.) As by product, one obtains 35% of 1-H-9-cyano-indeno[2,1-d]pyrimidine.

By crystallisation in acetone one obtains an analytically pure product, melting at 310° C. with a yield of 60%.

*Anlysis.*—Found: C=75.53%; H=4.45%; N=20.07%. For $C_{13}H_9N_3$ the calculation shows C=75.5%; H=4.35%; N=20.03%.

The sodium salt of 1-H-9-cyano-2-methyl-indeno[2,1-d]pyrimidine is prepared in the manner described in Example 1.

EXAMPLE 3

1. *Preparation of 1-Cyano-2-Propionylamino-Indene*

15.6 g. (9.1 mole) of 1-cyano-2-amino-indene are heated to boiling during 4 hours with 9.25 g. (0.1 mole) of pripionyl chloride and 100 cc. of anhydrous toluene. 0.05 mole of propionyl chloride are then added to the reaction mixture, which is further heated under reflux during 1 hour by cooling. The 1-cyano-2-propionylamino-indene is obtained with a yield of 93.3%. After recrystallisation in toluene crystals melting at 184–187° C. are obtained. Yield of pure product: 70%.

*Analysis.*—Found: C=73.80%; H=5.73%; O=7.80%; N=13.39%. Calculated: C=73.56%; H=5.69%; O=7.55; N=13.20%.

2. *Preparation of 1-H-9-Cyano-2-Ethyl-Indeno[2,1-d]-Pyrimidine*

21.1 g. of 1-cyano-2-propionylamino-indene are suspended in 300 cc. of formamide. The suspension is treated as described in Example 1 under section (1). The crude product (yield: 70%) consists actually in a mixture of 1-H-9-cyano-2-ethyl-indeno[2,1-d]pyrimidine and 1-H-9-cyano-indeno[2,1-d]pyrimidine. After separation of the former compound and recrystallisation in acetone, this compound melts at 293–294° C.

*Analysis.*—Found: C=76.61%; H=4.64%; N=18.72%. Calculated: C=75.94%; H=5.00%; N=18.90%.

EXAMPLE 4

1. *Preparation of 1-Cyano-2-Valeroylamino-Indene*

13.26 g. (0.073 mole) of 1-cyano-2-amino-indene are heated under reflux in 60 cc. of anhydrous toluene in the presence of 10 g. (0.083 mole) of valeroyl chloride. The reaction mixture is then treated as described in Example 2. After recrystallization in a mixture (80:100) of petroleum ether and toluene, the product melts at 188–189° C. Yield: 67%.

*Analysis.*—Found: C=74.95%; H=6.54%; N=11.81%. Calculated: C=75.00%; H=6.66%; N=11.66%.

2. *Preparation of 1-H-9-Cyano-2-Butyl-Indeno[2,1-d] Pyrimidine*

2.5 g. of 1-cyano-2-valeroylamino-indene are treated as described in Example 2 under section (2). One obtains a crude mixture of 1-H-9-cyano-2-butyl-indeno[2,1-d]pyrimidine and of 1-H-9-cyano-indeno[2,1-d] pyrimidine (yield: 64%).

By fractional crystallisation in acetone, one obtains 32% of pure 1-H-9-cyano-2-butyl-indeno[2,1-d] pyrimidine, as yellow-orange crystals melting at a temperature higher than 300° C.

*Analysis.*—Found: C=76.89%; H=6.20%; N=16.69%. Calculated: C=77.07%; H=6.06%; N=16.85%.

EXAMPLE 8

1. *Preparation of 1-Cyano-2-Benzoylamino-Indene*

1 g. of 1-cyano-2-amino-indene are mixed to 5 cc. of benzoyl chloride. By stirring and by heating the mixture on the oil bath, the indene compound dissolves and a bulky precipitate appears at about 90–95° C. The stirring is maintained at the same temperature for 10 minutes, then one cools quickly, one filters the crystals and washes them successively with hot water and with cold ethyl alcohol.

A pure product melting at 237–238.5° C. (1.05 g.) is obtained by crystallisation.

*Analysis.*—Found: C=78.26%; H=4.62%; N=10.63%; O=6.31%. For $C_{17}H_{12}N_2O$ the calculation shows: C=78.5%; H=4.62%; N=10.79%; O=6.15%.

2. *Preparation of 1-H-9-Cyano-2-Phenyl-Indeno[2,1-d]-Pyrimidine*

(Formula I: R=H; $R_1$=—$C_6H_5$)

1 g. of 1-cyano-2-benzoylamino-indene and 20 cc. of formamide are heated to boiling for 1 hour. After cooling or leaving it in the ice chest, the precipitate obtained (0.450 g.) is filtered. A further 0.285 g. of the crude product is obtained by diluting the mother liquors. Total yield: approximately 70%. As by-product one obtains 30% of 1-H-9-cyano-indenopyrimidine.

After recrystallisation from acetone and from dioxan, one obtains a product, melting at 275–277.5° C.

*Analysis.*—Found: C=80.27%; H=4.08%; H=15.65%. Calculated: C=79.96%; H=4.23%; H=15.20%.

EXAMPLE 6

1. *Preparation of 1-Cyano-2-p-Methylbenzoylamino-Indene*

8.5 g. of 1-cyano-2-amino-indene are heated under reflux with 60 cc. of toluene in the presence of 9 g. of toluyl chloride. After recrystallisation in a mixture of toluene and petroleum ether (80:100), the product melts at 200–201° C. Yield: 73%.

*Analysis.*—Found: C=79.02%; H=5.14%; N=10.07%. Calculated: C=78.83%; H=5.11%; N=10.22%.

2. *Preparation of 1-H-9-Cyano-2(p-Methylphenyl)-Indeno[2,1-d]Pyrimidine*

2.5 g. of 1-cyano-2-(p-methylbenzoyl)amino-indene are placed together with 40 cc. of formamide in a sealed tube. After heating during 3 hours at 180° C. and then during 1 hour at 190° C., the reaction mixture is extracted with 200 cc. of 0.04 N caustic soda. The mixture is filtered and the filtrate is acidified, so as to obtain a mixture of 1-H-9-cyano-2-(p-methphenyl)-indeno[2,1-d] pyrimidine (35%) and of 1-H-9-cyano-indeno[2,1-d] pyrimidine (25%).

The former product is recrystallised in acetone, so as to obtain yellow crystals melting at a temperature higher than 300° C. (decomposition).

*Analysis.*—Found: C=81.03%; H=4.68%; N=14.74%. Calculated: C=80.54%; H=4.62%; N=14.83%.

EXAMPLE 7

1. *Preparation of 1-Cyano-2-Methoxybenzoylamino-Indene*

10 g. of 1-cyano-2-aminoindene (0.064 mole) are refluxed in 60 cc. of anhydrous toluene, in the presence of 11.93 g. (0.07 mole) of anisoyl chloride. After recrystallisation in benzene, the product (yield: 60%) melts at 191–192° C.

*Analysis.*—Found: C=74.84%; H=5.01%; N=9.35%. Calculated: C=74.48%; H=4.83%; N=9.65%.

2. *Preparation of 1-H-9-Cyano-2-(p-Methoxy)Phenyl-Indene[2,1-d]Pyrimidine*

This compound is prepared as described in the preceding examples, from 2.5 g. of the compound prepared under section (1).

A crude mixture of the desired compound and of 1-H-9-cyano-indeno-[2,1-d]pyrimidine is obtained with a yield of 68%. After fractional recrystallisation of said mixture in acetone, the desired compound is obtained with a yield of 32%.

*Analysis.*—Found: C=76.40%; H=4.40%; N=13.91%. Calculated: C=76.23%; H=4.37%; N=14.03%.

EXAMPLE 8

1. *Preparation of 1-Cyano-2-p-Chlorobenzoylamino-Indene*

8.5 g. of 1-cyano-2-amino-indene (0.054 mole) are refluxed during 5 hours in 60 cc. of toluene, in the presence of 10.5 g. (0.06 mole) of p-chlorobenzoyl chloride. After cooling and filtration, the product is recrystallised in toluene. Yield: 65–70%.

*Analysis.*—Found: C=69.28%; H=3.77%; N=9.66%; Cl=12.11%. Calculated: C=69.27%; H=3.73%; N=9.50%; Cl=12.05%.

2. *Preparation of 1-H-9-Cyano-2-p-Chlorophenyl-Indeno[2,1-d]-Pyrimidine*

2.5 g. of 1-cyano-2-p-chlorobenzoylamino-indene are heated with 40 cc. of formamide in a sealed tube during 3 hours at 180° C. and then during 1 hour at 190° C.

A crude mixture (Yield: 62%) of the desired compound and of 1-H-9-cyano-indeno[2,1-d]pyrimidine is obtained.

By fractional crystallisation in acetone, yellow-orange crystals of the desired product are obtained.

*Analysis.*—Found: C=71.36%; H=3.41%; N=13.55%; Cl=11.68%. Calculated: C=71.1%; H=3.31%; N=13.83%; Cl=11.67%.

EXAMPLE 9

1. *Preparation of 1-Cyano-2-α-Naphthoylamino-Indene*

8.5 g. (0.054 mole) of 1-cyano-2-amino-indene are heated at reflux in 60 cc. of toluene in the presence of 12.2 g. (0.064 mole) of α-naphthoyl chloride. After recrystallisation in a mixture of toluene and petroleum ether, the desired product melts at 214–215° C. Yield: 66%.

*Analysis.*—Found: C=81.39%; H=4.93%; N=8.78%. Calculated: C=81.29%; H=4.51%; N=9.03%.

2. *Preparation of 1-H-9-Cyano-2-(α-Naphthyl)Indeno [2,1-d]-Pyrimidine*

2.5 g. of 1-cyano-2-α-naphthoylamino-indene are heated with 40 cc. of formamide in a sealed tube during 3 hours at 180° C. and then during 1 hour at 190° C.

The reaction mixture is then extracted with 200 cc. of 0.04 N caustic soda at a temperature of 40° C. The mixture is filtered and the filtrate is again extracted with caustic soda and filtered.

The alkaline extracts are combined, treated with charcoal and acidified, so as to obtain a crude mixture of 1-H-9-cyano indeno-[2,1-d]pyrimidine and of the desired compound. Yield 60%.

By fractional crystallisation in acetone, the desired compound is recovered as bright yellowish green crystals with a yield of 35%.

*Analysis.*—Found: C=82.82%; H=4.17%; N=13.16%. Calculated: C=82.99%; H=3.80%; N=13.20%.

EXAMPLE 10

1. *Preparation of the 1-Cyano-2-Phenylacetylamino-Indene*

5 g. of 1-cyano-2-amino-indene are added to 15 cc. of phenylacetyl chloride. The mixture is heated on the oil bath. The dissolution is complete at about 80° C., and a precipitate appears in the purple-red solution at about 90° C. After having continued the heating for further 5 minutes, the reaction mixture is cooled quickly and the precipitate filtered. This precipitate is washed with cold ethyl alcohol and dried sub vacuo. 6 g. of the crude product are thus obtained, melting at 210–220° C.

Crystals, melting at 221–224° C. are obtained by recrystallisation from ethyl alcohol.

*Analysis.*—Found: C=79.13%; H=5.06%; N=10.05%; O=5.76%. For $C_{18}H_{14}N_2O$ the calculation shows: C=78.75%; H=5.11%; N=10.2%; O=5.85%.

2. *Preparation of the 1-H-9-Cyano-2-Benzyl-Indeno[2,1-d]-Pyrimidine*

5.1 g. of 1-cyano-2-phenylacetylamino-indene are heated to boiling in 73 cc. of formamide. By cooling, one obtains 5.25 g. of a crude product (yield: 95.4%) which are recrystallised in methyl alcohol. One thus obtains with a yield of 60% a product, melting at 303–304° C. As byproduct one obtains 30% of 1-H-9-cyano-indeno-[2,1-d]-pyrimidine.

*Analysis.*—Found: C=80.69%; H=4.96%; N=14.50%. For $C_{19}H_{13}N_3$ the calculation shows: C=80.50%; H=4.62%; N=14.83%.

The sodium, potassium and ammonium salts of this compound are prepared in the manner described in Example 1.

EXAMPLE 11

1. *Preparation of 1-Cyano-2-(p-Methoxyphenylacetyl)-Amino-Indene*

7.8 g. of imino-nitrile (0.05 mole) are heated under reflux in 60 cc. of anhydrous toluene, in the presence of 11 g. (0.06 mole) of p-methoxyphenylacetoyl chloride. The mixture is heated during 5 hours.

After recrystallisation in a mixture of toluene and petroleum ether (80:100), the product melts at 178–179° C. Yield: 60%.

*Analysis.*—Found: C=75.20%; H=5.29%; N=9.09%. Calculated: C=75.00%; H=5.26%; N=9.21%.

2. *Preparation of 1-H-9-Cyano-2-p-Methoxybenzyl-Indeno[2,1-d]-Pyrimidine*

This compound is obtained from 2.5 g. of the acylated compounds prepared as described under section (1) by the process described in the preceding examples.

After fractional crystallisation in acetone, one obtains yellow-orange crystals (35%) of 1-H-9-cyano-2-p-methoxybenzyl-indeno[2,1-d]pyrimidine.

*Analysis.*—Found: C=76.04%; H=4.90%; N=13.28%. Calculated: C=76.65%; H=4.82%; N=13.41%.

EXAMPLE 12

1. *Preparation of 1-Cyano-2-β-Phenylpropionyl-Amino-Indene*

20.3 g. (0.15 mole) of 1-cyano-2-amino-indene are heated at reflux in 180 cc. of anhydrous toluene during 1 hour in the presence of 21.9 g. of β-phenylpropionyl chloride. After cooling, the reaction mixture is filtered. After crystallisation in ethanol, the pure product is obtained with a yield of 73%.

*Analysis.*—Found: C=79.2%; H=5.49%; N=9.20%. Calculated: C=79.14%; H=5.59%; N=9.36%.

2. *Preparation of 1-H-9-Cyano-2-β-Phenylethylene-Indeno[2,1-d]-Pyrimidine*

25 g. of 1-cyano-2-β-phenylpropionylamino-indene are suspended in 250 cc. of formamide and the suspension is treated as described in preceding examples. The obtained crude product is a mixture of the desired compound (25%) and of 1-H-9-cyano-indeno-[2,1-d]pyrimidine (25%). The desired compound is separated by fractional recrystallisation in a mixture of acetone and ether. The pure compound melts at 258–264° C.

*Analysis.*—Found: C=81.26%; H=5.29%; N=13.66%. Calculated: C=80.79%; H=5.08%; N=14.13%.

EXAMPLE 13

*Preparation of 1-H-9-Cyano-2-Bromo-Indeno-[2,1-d]-Pyrimidine and of the Sodium Salt Thereof*

3.86 g. (0.02 mole) of 1-H-9-cyano-indeno[2,1-d]pyrimidine are mixed with 100 cc. of carbone tetrachloride, 3.56 g. (0.02 mole) of N-bromosuccinimide and 0.3 g. of benzyl peroxide.

The mixture is heated on a water-bath and after the effervescence ceases, the reaction mixture is heated during 1 hour at the boiling temperature. After cooling, the white precipitate is filtered. After recrystallisation in acetone, the product melts at 304–306° C.

*Analysis.*—Found: C=53.62%; H=2.26%; N=14.91%; Br=28.89%. Calculated: C=53.00%; H=2.22%; N=15.44%; Br=29.38%.

The sodium salt of the 1-H-9-cyano-2-bromo-indeno-[2,1-d]pyrimidine is prepared by dissolving this compound in 0.1 N caustic soda at a temperature of about 40° C. By cooling the solution, the sodium salt precipitates and is filtered and dried. This salt is purified by recrystallisation in a mixture of anhydrous acetone and ether.

EXAMPLE 14

*Preparation of 1-H-9-Cyano-2-Nitro-Indeno[2,1-d]-Pyrimidine and of the Potassium Salt Thereof*

10 g. (0.0517 mole) of 1-H-9-cyano-indeno[2,1-d]pyrimidine are suspended in 250 cc. of glacial acetic acid.

3.6 cc. (0.0569 mole) of concentrated nitric acid are added and the mixture is rapidly heated at 60° C. After cooling by means of ice, the reaction mixture is filtered at 0° C. and the precipitate is washed with water, benzene and acetone. The crude product is obtained with a yield of 53% (6.48 g.).

This product is dissolved in about 200 cc. of 0.1 N caustic potash and after addition of water until a clear solution is obtained, the boiled mixture is treated with charcoal and filtered. After drying, this salt is recrystallised in ethanol.

The 1-H-9-cyano-2-nitro-indeno-[2,1-d]pyrimidine melts at a temperature higher than 310° C.

*Analysis.*—Found: C=60.47%; H=3.10%; N=22.35%; O=13.93%. Calculated: C=60.50%; H=2.53%; N=23.52%; O=13.43%.

I claim:
1. 1-H-9-cyano-2-indeno[2,1-d]-pyrimidine of the formula

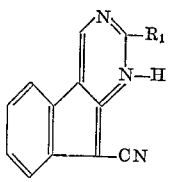

wherein $R_1$ is a member selected from the group consisting of H, Br, nitro, alkyl with 1 to 4 carbon atoms, phenyl, methylphenyl, methoxyphenyl, chlorophenyl, naphthyl, benzyl, methylbenzyl, methoxybenzyl, cyclopentyl, cyclohexyl and phenyl-ethyl.

2. A potassium salt of the formula

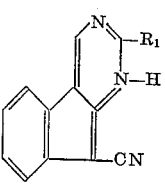

wherein $R_1$ is a member selected from the group consisting of H, Br, nitro, alkyl with 1 to 4 carbon atoms, phenyl, methylphenyl, methoxyphenyl, chlorophenyl, naphthyl, benzyl, methylbenzyl, methoxybenzyl, cyclopentyl, cyclohexyl and phenyl-ethyl.

3. A sodium salt of the formula

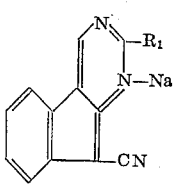

wherein $R_1$ is a member selected from the group consisting of H, Br, nitro, alkyl with 1 to 4 carbon atoms, phenyl, methylphenyl, methoxyphenyl, chlorophenyl, naphthyl, benzyl, methylbenzyl, methoxybenzyl, cyclopentyl, cyclohexyl, and phenyl-ethyl.

4. 1-H-9-cyano-2-ethyl-indeno[2,1-d]-pyrimidine.
5. 1-H-9-cyano-2-methyl-indeno[2,1-d]-pyrimidine.
6. 1-H-9-cyano-2-butyl-indeno[2,1-d]-pyrimidine.
7. 1-H-9-cyano-2-phenyl-indeno[2,1-d]-pyrimidine.
8. 1-H-9-cyano-2-(p-methyl-phenyl)-indeno[2,1-d]-pyrimidine.
9. 1-H-9-cyano-2-(p-methoxyphenyl)-indeno[2,1-d]-pyrimidine.
10. 1-H-9-cyano-2-(p-chlorophenyl)-indeno[2,1-d]-pyrimidine.
11. 1-H-9-cyano-2-(α-naphthyl)indeno[2,1-d]-pyrimidine.
12. 1-H-9-cyano-2-benzyl-indeno[2,1-d]-pyrimidine.
13. 1-H-9-cyano-2-nitro-indeno[2,1-d]-pyrimidine.
14. 1-H-9-cyano-2-bromo-indeno[2,1-d]-pyrimidine.
15. A process for the preparation of 1-H-9-cyano-2-$R_1$-indeno[2,1-d]-pyrimidine of the formula

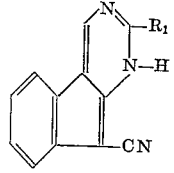

wherein $R_1$ is a member selected from the group consisting of H, Br, nitro, alkyl with 1 to 4 carbon atoms, phenyl, methylphenyl, methoxyphenyl, chlorophenyl, naphthyl, benzyl, methylbenzyl, methoxybenzyl, cyclopentyl, cyclohexyl and phenyl-ethyl, which comprises heating 1-cyano-2-amino-indene of the formula

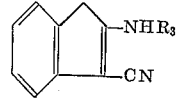

wherein $R_3$ is a member selected from the group consisting of hydrogen and —CO.$R_1$, in which $R_1$ is as precedingly defined, under reflux in formamide.

16. A process for the preparation of an alkali metal salt of the formula

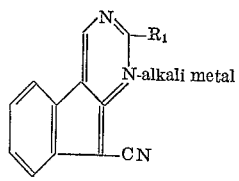

wherein $R_1$ is a member selected from the group consisting of H, Br, nitro, alkyl with 1 to 4 carbon atoms, phenyl, methylphenyl, methoxyphenyl, chlorophenyl, naphthyl, benzyl, methylbenzyl, methoxybenzyl, cyclopentyl, cyclohexyl and phenyl-ethyl, which comprises heating 1-cyano-2-amino-indene of the formula

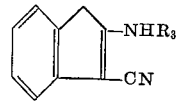

wherein $R_3$ is a member selected from the group consisting of hydrogen and —CO.$R_1$, in which $R_1$ is as precedingly defined, under reflux in formamide, and converting the resultant compound to the alkali metal salt by reacting the last-mentioned compound with the corresponding alkali metal hydroxide.

17. A process for preparing 1-H-9-cyano-2-nitro-indene[2,1-d]-pyrimidine, which comprises heating 1-H-9-cyano-indene[2,1-d]-pyrimidine with nitric acid in glacial acetic acid as solvent.

18. A process for preparing 1-H-9-cyano-2-bromo-indeno[2,1-d]-pyrimidine, which comprises heating 1-H-9-cyano-indeno[2,1-d]-pyrimidine with brominating agent.

No references cited.